(12) United States Patent
Rasifard et al.

(10) Patent No.: US 9,687,919 B2
(45) Date of Patent: Jun. 27, 2017

(54) METHOD AND SYSTEM FOR INTRODUCING RECESSES IN WORKPIECE SURFACES TO BE MACHINED, WITH THE AID OF AT LEAST ONE TOOL

(71) Applicant: Schaeffler Technologies AG & Co. KG, Herzogenaurach (DE)

(72) Inventors: Abdolreza Rasifard, Buhlertal (DE); Stefan Steinmetz, Esslingen (DE); Patrick Knecht, Muggensturm (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 201 days.

(21) Appl. No.: 14/428,148

(22) PCT Filed: Aug. 14, 2013

(86) PCT No.: PCT/DE2013/200126
§ 371 (c)(1),
(2) Date: Mar. 13, 2015

(87) PCT Pub. No.: WO2014/040597
PCT Pub. Date: Mar. 20, 2014

(65) Prior Publication Data
US 2015/0258614 A1 Sep. 17, 2015

(30) Foreign Application Priority Data
Sep. 17, 2012 (DE) .......................... 10 2012 216 492

(51) Int. Cl.
*B23C 3/28* (2006.01)
*B23C 3/30* (2006.01)
*F16D 69/00* (2006.01)
*B23P 13/02* (2006.01)
(Continued)

(52) U.S. Cl.
CPC ................ *B23C 3/30* (2013.01); *B23P 13/02* (2013.01); *B24B 19/02* (2013.01); *F16D 69/00* (2013.01); *B23C 2220/36* (2013.01); *B23C 2270/14* (2013.01); *F16D 2069/004* (2013.01); *F16D 2069/0491* (2013.01);
(Continued)

(58) Field of Classification Search
CPC ......... B23C 3/28; B23C 3/30; B23C 2270/14; B23C 2270/16; B24B 19/02
USPC ................ 409/131–132; 144/136.1; 408/54; 83/875
See application file for complete search history.

(56) References Cited

U.S. PATENT DOCUMENTS 121,059 A * 11/1871 Moeller et al. ........ B27G 13/10
144/218
705,658 A * 7/1902 Edwards et al. ........ B23B 41/12
408/36
(Continued)

FOREIGN PATENT DOCUMENTS

| DE | 19512934 | 10/1996 |
|---|---|---|
| DE | 102010025403 | 1/2011 |

(Continued)

*Primary Examiner* — Daniel Howell
(74) *Attorney, Agent, or Firm* — Volpe and Koenig, P.C.

(57) ABSTRACT

A method for introducing recesses in workpiece surfaces to be machined, with the aid of at least one tool. The invention is characterized in that two workpiece surfaces that face each other are simultaneously machined using the tool in order to introduce recesses into said workpiece surfaces.

7 Claims, 1 Drawing Sheet

(51) Int. Cl.
    *B24B 19/02*     (2006.01)
    *F16D 69/04*     (2006.01)

(52) U.S. Cl.
    CPC ............... Y10T 409/303752 (2015.01); Y10T 409/308792 (2015.01); Y10T 409/309016 (2015.01)

(56) References Cited

U.S. PATENT DOCUMENTS

| | | | | |
|---|---|---|---|---|
| 1,705,893 A * | 3/1929 | Barnhart | .................. | B23C 3/20 409/118 |
| 2,363,085 A * | 11/1944 | Roye | ...................... | B23B 47/28 408/104 |
| 2,428,301 A * | 9/1947 | Surerus | .................... | B23C 3/34 409/132 |
| 2,623,438 A * | 12/1952 | Ockerman | ............... | B23C 3/34 408/54 |
| 2,807,875 A * | 10/1957 | Snyder | ................... | B23B 49/02 144/203 |
| 3,083,440 A * | 4/1963 | Barbknecht | ............. | B21J 19/00 29/14 |
| 4,653,557 A * | 3/1987 | Merrill | ..................... | B27F 1/08 144/1.1 |
| 4,925,347 A * | 5/1990 | Seki | .......................... | B23C 3/12 409/132 |
| 5,480,007 A | 1/1996 | Hartford | | |
| 6,158,487 A * | 12/2000 | Licari | ................. | B23Q 9/0014 144/144.1 |
| 6,186,293 B1 | 2/2001 | Beer et al. | | |
| 6,585,089 B1 | 7/2003 | Parker | | |
| 7,721,410 B2 * | 5/2010 | Kurt | ..................... | B23Q 1/4842 29/560 |

FOREIGN PATENT DOCUMENTS

| | | | | |
|---|---|---|---|---|
| GB | 1477485 A | * | 6/1977 | ............... B24B 9/00 |
| JP | 58186540 A | * | 10/1983 | |
| JP | 02205455 A | * | 8/1990 | |
| JP | 02232109 A | * | 9/1990 | |
| JP | 03019707 A | * | 1/1991 | |
| JP | 04030930 A | * | 2/1992 | |
| JP | 2009105211 | | 5/2009 | |
| SU | 1271678 A1 | * | 11/1986 | |

* cited by examiner

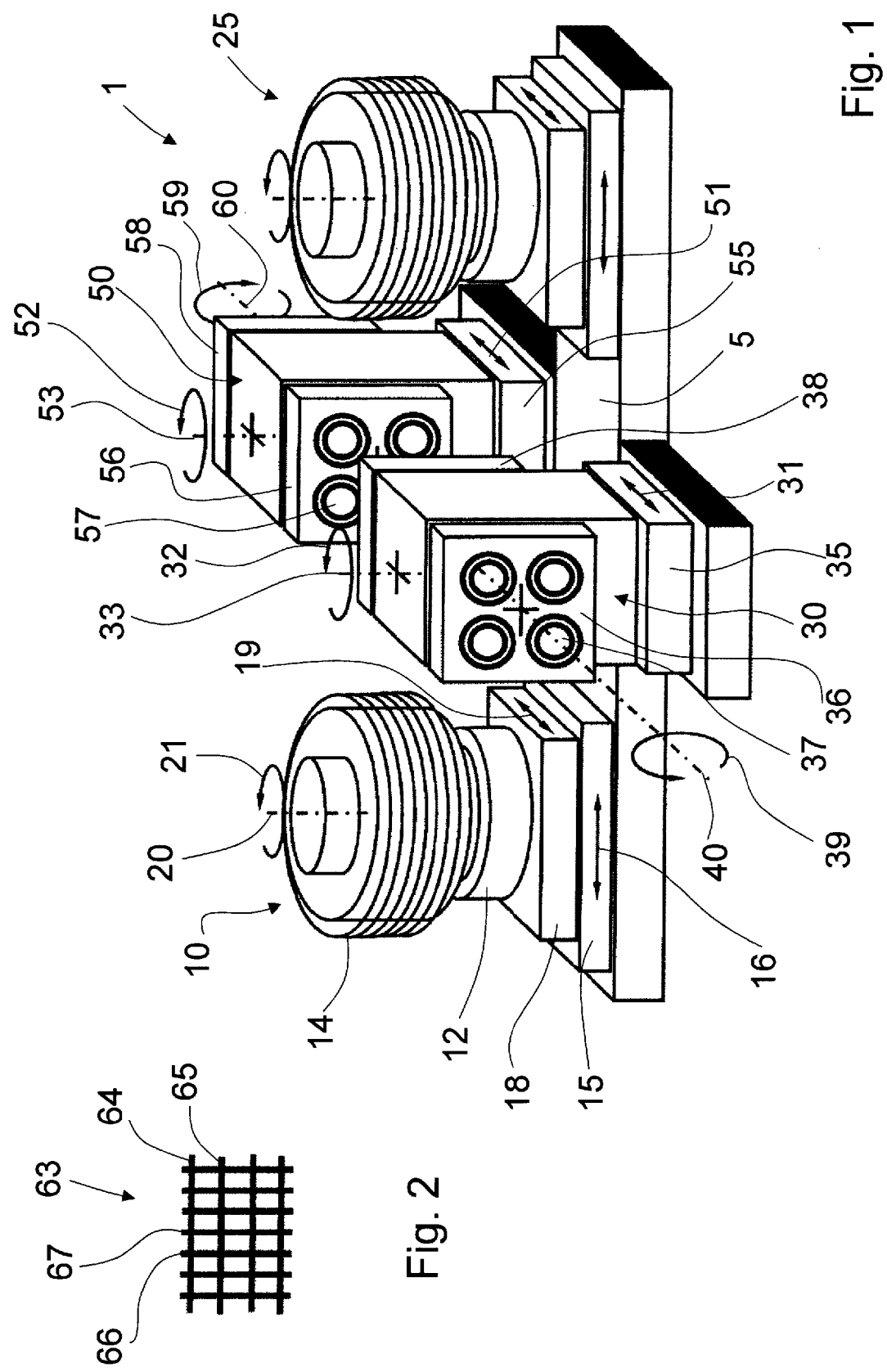

METHOD AND SYSTEM FOR INTRODUCING RECESSES IN WORKPIECE SURFACES TO BE MACHINED, WITH THE AID OF AT LEAST ONE TOOL

BACKGROUND

The invention relates to a method and a system for introducing recesses in work piece surfaces to be machined, with the aid of at least one tool.

A method is known from the German patent publication DE 10 2010 025 403 A1 for the production of a friction coating for a friction clutch with a coating material compressed on a carrier sheet.

SUMMARY

The objective of the invention is to simplify the introduction of recesses in work piece surfaces to be machined with the aid of at least one tool.

The objective is attained in a method for introducing recesses in work piece surfaces to be machined with the aid of at least one tool such that two work piece surfaces facing each other are simultaneously processed with the tool, in order to introduce recesses in work piece surfaces. These recesses represent, grooves, for example. It is particularly advantageous for these grooves or longitudinal grooves to extend parallel and to intersect other, parallel extending grooves or longitudinal grooves such that a waffle shape develops. The work piece surfaces represent preferably surfaces and/or friction areas of friction coatings, particularly wet-running lamellae. The method according to the invention may also be used in other fields, such as the semiconductor industry, particularly for chip separation. According to an essential aspect of the invention the two work piece surfaces facing each other, are processed simultaneously, particularly machined. The machining comprises for example a cutting and/or polishing.

A preferred exemplary embodiment of the invention is characterized in that the two tool surfaces of the tool, facing away from each other, simultaneously processing two work piece surfaces facing each other. This provides the advantage that the work piece surfaces facing each other can simultaneously be processed with a single tool, particularly comprising a cutting and/or polishing set. Here, the tool contacts the work piece at two different points of its periphery, arranged at an angle of 180 degrees in reference to each other.

The above-stated objective is attained in a device for inserting recesses in work piece surfaces to be machined with the help of at least one tool, particularly according to an above-described method, alternatively or additionally such that the device comprises two changeable supports with at least two work piece receivers, facing each other, and a machine bed, which extends in a x-y plane through and between the changeable supports. The changeable supports serve to receive the work pieces and for this purpose they are provided with clamping plates, for example. By the combination of work piece receivers facing each other with the machine bed the tool can be easily moved between and through the changeable supports for the simultaneous processing of two work piece surfaces facing away from each other.

A preferred exemplary embodiment of the system is implemented such that the changeable supports have two work piece receivers, facing away from each other. This way a loading and unloading of the system is implemented in a simple fashion. The work piece receivers can be loaded or unloaded, particularly advantageously during the processing of the work pieces at the work piece receivers facing each other.

Another preferred exemplary embodiment of the system is attained such that the work piece receivers are rotational by c1 and c2-axes of rotation, which are arranged perpendicular in reference to an x-direction and parallel in reference to in a y-direction. The c1 and the c2-axes of rotation may define a common axis of rotation. By rotating the work piece receivers about a defined angle of rotation a plurality of patterns of longitudinal grooves can be generated in the work piece surfaces.

Another preferred exemplary embodiment of the system is implemented such that the tool can be moved in a translational fashion in a positive and negative x-direction between the changeable supports. In order to implement the translational movement between and through the changeable supports, the tool comprises a spindle sled for example, which can be moved back and forth in the x-direction. The x-direction represents the primary feeding direction of the tool. To this regards, the processing of the work piece surfaces facing each other can be called a planar-circumferential lateral-processing method. This preferably represents a planar-circumferential lateral cutting process.

Another preferred exemplary embodiment of the system is attained such that the tool can be moved back and forth in a positive and negative y1-direction in a translational fashion between the changeable supports. In order to illustrate the translational movement between the changeable supports the tool preferably comprises a second spindle sled. Using the second spindle sled the tool can be positioned in a simple fashion between the changeable supports.

Another preferred exemplary embodiment of the system is implemented such that the tool is rotational about an axis of rotation, which is arranged perpendicular in reference to the x-y plane. The tool is preferably embodied as a spindle unit. The spindle unit can either comprise a compact spindle motor or a spindle with a spindle drive engine and a transmission. The spindle advantageously drives a tool via a spindle, which comprises several cutting or polishing disks. The cutting or polishing disks are advantageously designed on a spindle shaft of the spindle unit with spacers arranged therebetween. By the geometry and the arrangement of the tool disks, particularly the cutting or polishing disks, the dimensions and the number of the recesses to be generated, particularly the grooves, can be varied.

Another preferred exemplary embodiment of the system is implemented such that the changeable supports are rotational about c3 and c4-axes of rotation, which are arranged perpendicular in reference to the x-y plane. This way, the tool receivers can easily be rotated between a processing position and a loading and/or unloading position. In the processing position respectively two tool receivers are facing each other. In the loading and/or unloading position respectively two tool receivers are pointing away from each other. It is particularly advantageous for two tool receivers to respectively face each other simultaneously and two tool receivers to point away from each other.

Another preferred exemplary embodiment of the system is implemented such that the changeable supports are mobile towards and away from each other in the y2 and y3-directions. By the motions of the changeable supports towards and away from each other the depth of the recesses, particularly the grooves, can be adjusted in a simple fashion.

According to other exemplary embodiments the tool system and/or the changeable supports can be additionally mobile perpendicular in reference to the x-y plane. This way, the system according to the invention is provided with even more flexibility.

BRIEF DESCRIPTION OF THE DRAWINGS

Additional advantages, features, and details of the invention are discernible from the following description, in which various exemplary embodiments are described in detail with reference to the drawing. Shown are:

FIG. 1 a simplified illustration of a system according to the invention, and

FIG. 2 a simplified illustration of a waffle pattern, which can be inserted in work piece surfaces using the system shown in FIG. 1.

DETAILED DESCRIPTION OF THE PREFERRED EMBODIMENTS

FIG. 1 shows in a simplified fashion a system 1 for inserting recesses in work piece surfaces to be machined. The system 1 comprises a machine bed 5, which essentially has the form of a cube extending in the x-y plane. A tool 10 is arranged in a mobile fashion on the machine bed 5.

The tool 10 comprises a spindle unit 12 and a tool set 14. The tool set 14 comprises several tool disks, particularly cutting or polishing disks, which are located on a spindle shaft of the spindle unit 12 with spacers located therebetween.

The tool 10 can move back and forth in a translational fashion in an x-direction with the help of a first spindle sled 15, as indicated by a double-arrow 16. With the aid of a second spindle sled 18 the tool 10 can be moved back and forth in a y1-direction, as indicated by a double-arrow 19. Furthermore, the tool 10 is rotational about an axis of rotation 20, as indicated by an arrow 21. The axis of rotation 20 is arranged perpendicular in reference to the x-y plane.

The reference character 25 marks either another tool or a second position of the tool 10. The tool 10 can be moved on the machine bed 5 along the x-direction 16 between and through two changeable supports 30, 50. Here, the x-direction represents the primary feed direction of the tool 10 and/or 25.

The changeable supports 30, 50, as indicated by the double-arrows 31, 51, can be moved towards each other or away from each other in a translational fashion along a y2-axis and/or a y3-axis or a y2-direction and/or a y3-direction. The motion of the changeable supports 30, 50 in the direction of the double-arrows 31, 51 is illustrated by the tool sled 35, 55, by which the changeable supports 30, 50 are guided on a machine bed 5.

It is indicated by other arrows 32, 52 that the changeable supports 30, 50 are rotational about axes of rotation 33, 53. The axes of rotation 33 and 53 are arranged parallel in reference to each other and perpendicular in reference to the x-y plane. The axes of rotation 33, 53 are also called c4 and/or c3-axes.

The changeable support 30 comprises a tool receiver 36 with a total of four work pieces 37. A second work piece receiver 38 of the changeable support 30 also comprises four work pieces. It is indicated by an arrow 39 that the two work piece receivers 36 and 38 are rotational about an axis of rotation 40, which is also called c1-axis. The axis of rotation or the c1-axis is arranged parallel in reference to the y1-direction 19.

The changeable support 50 comprises a work piece receiver 56 with a total of four work pieces 57. A second tool receiver 58 of the changeable support 50 also comprises four work pieces. An arrow 59 indicates that the two work piece receivers 56 and 58 are rotational about an axis of rotation 60, which is also called c2-axis. Similarly, the axes of rotation 33 and 53 are called c4 and c3-axes. The axis of rotation or the c2-axis 60 preferably coincide with the axis of rotation or the c1-axis 40.

The tool receivers 38 and 56 extend parallel in reference to each other and face each other such that they can be processed simultaneously with the tool 10 and/or the tool 25. The work piece receivers 36 and 58 are also arranged parallel, but pointing away from each other. This way, the work piece receivers 36 and 58 preferably embodied as clamping plates, can easily be loaded and/or unloaded with work pieces, while the work pieces of the work piece receivers 38 and 56 facing each other are simultaneously processed.

FIG. 2 shows a waffle pattern 63, which can be produced in a simple fashion with the system 1 shown in FIG. 1. The waffle pattern 63 comprises several oblong recesses 64 to 67 intersecting each other, which are also called grooves, longitudinal grooves, or riffles.

Such waffle patterns are used for example as wet-running lamellae of motor vehicle clutches, in order to allow a cooling oil flow through the friction coatings. The cooling oil flow improves the heat dissipation during the operation of the friction coatings. Such waffle patterns are also used in the semiconductor industry in order to produce individual components and/or circuits by cutting a semiconductor disk.

The system 1 shown in FIG. 1 serves in a particularly advantageous fashion for the industrial production of wet-running coatings for the use of wet-running double-clutches, hydraulic brakes, as well as clutches in the two-wheeler field. The system 1 preferably produces waffle patterns as shown in FIG. 2, in paper friction pads.

The system 1 according to the invention allows in a particularly advantageous fashion the processing of eight work pieces simultaneously using a single tool. Furthermore, the changeable supports 30, 50 can be loaded and unloaded during the processing of the eight work pieces by said tool 10. This way the clock time during the production of the waffle patterns can be considerably reduced.

The tool receivers 36, 38, and 56, 58 are embodied as clamping plates, for example. The respectively four work pieces can be clamped on the clamping plates magnetically or pneumatically.

The work piece receivers 36, 38, and 56, 58 are rotational about the axes of rotation 40, 60, independent from each other. By the rotation of the tool receivers and/or the clamping plates between two certain angular positions intersecting grooves can be inserted in the work pieces with an arbitrary angle of intersection.

When processing new work pieces, the tool 10 initially moves in the positive x-direction, thus in FIG. 1 towards the right, simultaneously cutting and/or polishing a first group of parallel grooves into all eight work pieces which are clamped on the clamping plates 38, 58 facing each other. After a complete travel of the tool 10, the clamping plates and/or the work piece receivers 38, 56 with the work pieces are rotated by a certain angle about the axes of rotation 40, 60. During the return travel of the tool in the negative x-direction, thus in FIG. 1 from the right towards the left, the waffle patterns are simultaneously finished in all eight work pieces.

Parallel to the polishing or cutting, respectively eight new work pieces can be clamped on the work piece receivers 36, 58 pointing away from each other. This way, the time for changing the work pieces can be partially or entirely eliminated. After the tool 10 has completed its return travel, the two exchange columns 30, 50 are rotated by 180 degrees about their axes of rotation 33, 53. This way, the finished work pieces are brought into their unloading position and the newly clamped work pieces are brought into their processing position.

By using two different tools 10 and 25, in a simple fashion different distribution patterns can be generated in two directions. The waffle pattern illustrated in FIG. 2 shows horizontal longitudinal grooves 64, 65, distanced from each other to a slightly wider extent than the vertical longitudinal grooves 66, 67. Accordingly, this waffle pattern cannot be generated with a single tool device 10. The horizontal longitudinal grooves 64, 65 are generated with the tool 10, for example. The vertical longitudinal grooves 66, 67 are generated with the tool 25, for example.

LIST OF REFERENCE CHARACTERS 1 system
5 machine bed
10 tool
12 spindle unit
14 tool set
15 first spindle sled
16 double arrow
18 second spindle sled
19 double arrow
20 axis of rotation
21 arrow
25 tool
30 changeable support
31 double arrow
32 arrow
33 axis of rotation
35 work piece sled
36 work piece receiver
37 work pieces
38 work piece receiver
39 arrow
40 axis of rotation
50 changeable support
51 double arrow
52 arrow
53 axis of rotation
55 work piece sled
56 work piece receiver
57 work pieces
58 work piece receiver
59 arrow
60 axis of rotation
63 waffle pattern
64 recesses
65 recesses
66 recesses
67 recesses

The invention claimed is:

1. A method for inserting recesses in work piece surfaces to be machined with the aid of at least one tool, the method comprising:
    providing two changeable supports with two work piece receivers facing each other and one machine bed, which extends in a x-y plane between the changeable supports, the changeable supports each comprise two work piece receivers facing away from each other,
    processing two work piece surfaces facing each other simultaneously with the tool, and
    inserting the recesses in the work piece surfaces by machining.

2. The method according to claim 1, further comprising simultaneously processing the two work piece surfaces facing each other by two tool surfaces of the tool facing away from each other.

3. A system for inserting recesses in work piece surfaces to be processed with the aid of at least one tool, the system comprising two changeable supports with two work piece receivers facing each other and one machine bed, which extends in a x-y plane between the changeable supports, wherein the changeable supports each comprise two work piece receivers facing away from each other.

4. The system according to claim 3, wherein the work piece receivers are each rotational about a respective rotary axis, the rotary axes are arranged perpendicular in reference to an x-direction and parallel in reference to a y-direction.

5. A system for inserting recesses in work piece surfaces to be processed with the aid of at least one tool, the system comprising two changeable supports with two work piece receivers facing each other and one machine bed, which extends in a x-y plane between the changeable supports, and the tool is movable in a translational fashion in at least one of:
    (a) a positive and negative x-direction between and through a position of the changeable supports, or
    (b) a positive and negative y-direction back and forth between the changeable supports.

6. A system for inserting recesses in work piece surfaces to be processed with the aid of at least one tool, the system comprising two changeable supports with two work piece receivers facing each other and one machine bed, which extends in a x-y plane between the changeable supports, and at least one of:
    (a) the tool is rotational about an axis of rotation, which is arranged perpendicular in reference to the x-y plane, or
    (b) the changeable supports are rotational about respective axes of rotation, which are arranged perpendicular in reference to the x-y plane.

7. The system according to claim 3, wherein the changeable supports are movable towards and away from each other in a y-direction.

* * * * *